United States Patent Office 3,264,190
Patented August 2, 1966

3,264,190
METHOD AND MEANS FOR PURIFYING A NUCLEAR REACTOR FUEL SOLUTION
Karl Janner, Erlangen, Germany, assignor to Siemens-Schuckertwerke Aktiengesellschaft, Berlin-Siemensstadt and Erlangen, Germany
Filed June 4, 1963, Ser. No. 285,321
Claims priority, application Germany, June 9, 1962, S 79,868
8 Claims. (Cl. 176—37)

My invention relates to methods and means for purifying a nuclear reactor fuel solution.

As a rule, the fuel solution used in nuclear reactors of the homogeneous types attacks the walls of the reactor vessel and the other components that make up the fuel circulatory system. When the resulting corrosion products become too concentrated, they may deposit within the circulatory system and thus cause local separation of fissile material resulting in such defects as overheating and damage to the wall structure. It is therefore necessary to continuously remove the corrosion products from the circulatory system or to cause their precipitation at localities no longer reached by intensive neutron radiation so that no damage is done. It is known to thus precipitate corrosion products and fission products evolving during operation of homogeneous reactors by additionally heating the walls to a temperature higher than that of the nuclear fuel solution. Often, however, it is infeasible to attach or install the necessary heating equipment, particularly in reactor plants that are located in places difficult to reach, as is the case, for example, in subterranean reactors mounted in drill holes which serve to heat underground mineral veins or the like deposits. Especially in such cases, however, a simple and maintenance-free removal of corrosion and fission products is urgently desirable.

It is an object of my invention to provide a method and means for clearing corrosion and fission products from solutions of fissionable fuel in nuclear reactors of the homogeneous type at any selected location in the fuel circulatory system without having to apply heat from the outside.

To this end, and in accordance with a feature of my invention, the corrosion and fission products are deposited in the circulatory system in the range of the maximum solution temperature at boundary walls of the circulatory system heated to a temperature that is higher than that of the fuel solution, and the increased wall temperature is produced by nuclear or chemical processes and preferably promoted by appropriate structural means for reducing heat dissipation.

This method is based on the discovery that part of the beta and gamma radiation emanating from the fission products carried along in the nuclear fuel solution, is absorbed in the wall of the pipelines. Normally, there is a temperature drop from the interior of the pipe to the outside thereof. However, if every location in the pipeline system where fission products are to be deposited were insulated from the exterior, for example with quartz foam, or any other suitable fibrous mineral insulator, against every possible kind of heat loss, all of the heat arising in the wall must flow back into the nuclear fuel solution. In other words, the wall takes on a higher temperature than that of the solution at these locations. Since the inner surface area of the pipe varies proportionally with its radius whereas the cross-sectional area of the solution at these locations varies in accordance with the square of the radius, the radiation flux density and consequently the density of the heat source in the wall, arising from the gamma radiation increases as the diameter of the pipe increases. This applies to pipe radii within the range of practical interest in which gamma radiation is only slightly absorbed in the solution. It is therefore desirable under certain conditions to increase the radius of the pipe at the deposit locations. In addition, the walls of the pipelines are suitably constructed of such thickness or else a material that is strongly gamma-ray absorptive (Pb, U) is incorporated therein so that the greater part of the radiation is absorbed. For example, approximately half of the fission product gamma radiation energy is absorbed in a steel wall that is 2.5 centimeters thick. In order to obtain the same absorption with the given energy spectrum, a layer of lead only approximately 1 centimeter thick is required.

When a reactor of this type starts operating, the nuclear fuel solution is still inactive, i.e. it contains a comparatively small amount of fission products. The wall temperature, therefore, increases only as the formation of fission products increases, and, a corresponding separation and depositing action then takes place.

Usually a corrosion-protective layer forms on the walls that are in contact with the fuel solution and which consist of suitably selected structural material, for example material consisting of No. 347 steel (German steel type 4550) when in contact with 0.17 molar uranyl sulphate solution at 250° C., if the stream flow rate is less than about 3 meters per second. When the formation of this layer is practically completed, the further rate of corrosion becomes relatively small. In order to prevent the corrosion products, which are produced prior to the formation of this protective layer, from being incorporated into the fuel solution when the reactor starts to operate, it is desirable that the vulnerable walls be previously passivated. The walls are passivated before the reaction operation proper is initiated, by artificially coating them with a protective layer, for example by treatment with a solution having a similar chemical effect as the nuclear fuel solution itself. Harmful accumulation of corrosion products in the nuclear fuel solution can thus be avoided before settling out occurs.

In addition, these wall portions can be heated at start-up to a temperature that is even greater than can be achieved during normal operating conditions, if the pipe walls at the locations where settling out occurs contain fissionable material or have a coating of fissionable material. This material will then be excited to nuclear fission by the delayed neutrons of the nuclear fuel solution, which produce in this case a temperature increase in the insulating walls from the very start of the reactor operation.

Naturally, the initially inactive nuclear fuel solution can be mixed with radioactive material so that settling out of corrosion products can take place from the beginning of the reactor operation.

Furthermore, it is also possible to heat the wall at the locations where deposition takes place by using the recombination heat of the substances produced by radiolysis and which are capable of undergoing an endothermic reaction. For example, if water is contained in a reactor core, among other things $H_2O_2$, $H_2$ and $O_2$ are formed as a result of radiolysis. Upon the recombination of oxygen and hydrogen in the presence of a catalyst such as platinum which is installed at the locations in the pipeline system where settling out occurs, the heat freed in the process is conducted for the most part to the specific wall at which the settling out takes place.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
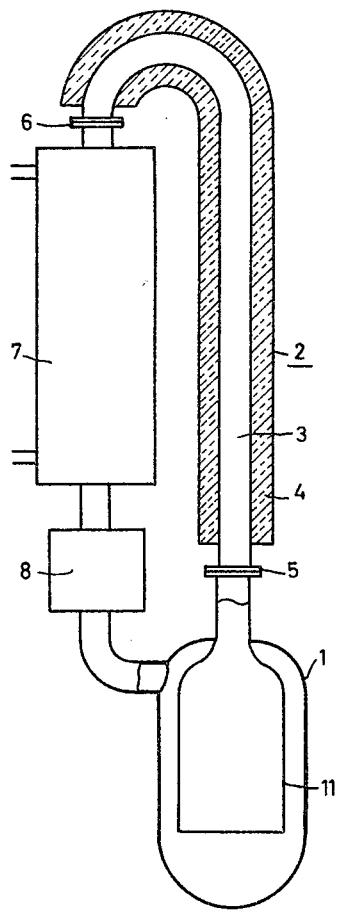
FIG. 1 is a diagrammatic view of the homogeneous nuclear reactor and its circulatory system including one embodiment of the apparatus for clearing corrosion and fission products from the fuel solution constructed in accordance with my invention.
Figure 3:
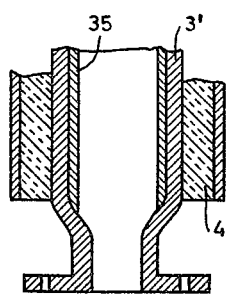
FIG. 3 is a fragmentary sectional view of a modification in the embodiment shown in FIG. 2.

The circulatory system of a homogeneous reactor 1 is shown in FIG. 1. The circulating loop portions 2 is provided with locations at which the corrosion and fission products precipitate or settle out. The discharge pipe 3 conveys the hot solution from the reactor 1 to the heat exchanger 7 to which it is connected and returns from the heat exchanger 7 through the pump 8 to the reactor vessel 1. The cooled solution is deflected by a screen 11 represented diagrammatically in FIG. 1 to flow downwardly along the reactor vessel walls, so as to protect the latter accordingly from excessive thermal stresses and, above all, from excessive chemical attack by the far more aggressive hot solution in the interior of the reactor vessel. Two connecting flanges 5, 6 are provided at the ends of the pipeline 3, which are practically the limiting boundaries of the location where precipitation takes place. The flanges 5, 6 permit the pipe length 3 to be replaced by a similar pipe length 3 when necessary to remove the precipitation products formed therein. A heat-insulating sheathing 4 of a highly efficient thermal insulating material, for example of quartz foam or any other suitable mineral fiber, surrounds this pipe 3. Various devices can be provided along the pipe 3 to increase the temperature thereof. The particular component or plurality of components in combination which can be used in carrying out the settling-out process, depend upon the type of nuclear fuel solution in the reactor. It would accordingly be desirable, for example, to introduce an additional amount of nuclear fuel in container form, shaped like a pipe 35 that lies close up against the pipe 3' as shown in FIG. 3. A catalyst for recombination of material formed radiolytically, for example oxygen and hydrogen, can be provided in similar container form.

Figure 4:
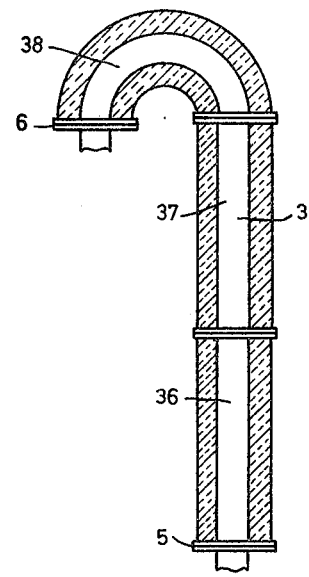
FIG. 4 is a longitudinal section partly diagrammatic of a modified form of the embodiment shown in FIG. 1.

The pipe 3 can also be subdivided into additional individual pipe or conduit sections 36, 37 and 38 (see FIG. 4) which can be connected together with flanges, each of the pipe sections serving a particular purpose, for example to generate heat by additional nuclear fission, to conduct the heat of recombination to the pipe walls, or to generate heat of absorption by suitably increasing the thickness of the pipe walls. The arrangement shown in FIG. 1 can also be used without the pump 8 and can operate in accordance with the principles of natural circulation since the pipe 3 extends in a substantially straight line.

Figure 2:
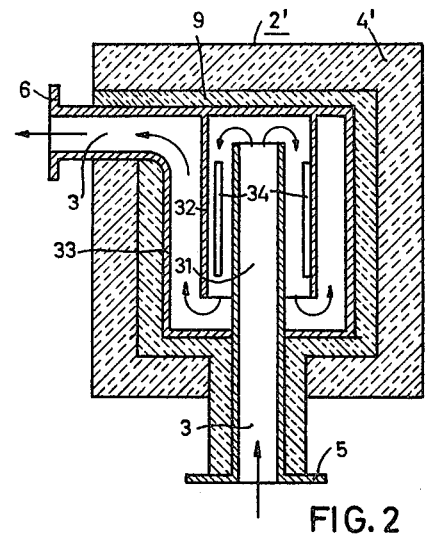
FIG. 2 is a transverse sectional view of another embodiment of my invention.

For the embodiment of FIG. 2, which provides a substantially greater resistance to flow than does the embodiment of FIG. 1, operation with a circulating pump 8 is preferred. In FIG. 2 circulating loop portion 2' which is built into the circulating system between the connecting flanges 5 and 6 is quite different from the portion of the circulating loop 2 shown in FIG. 1. The circulating loop portion 2' is particularly advantageous in that it has an exceptionally large surface area provided by a baffle arrangement. The nuclear fuel solution flows through the flange 5 into the system of FIG. 2, is deflected at the top after leaving the pipe portion 31 to flow along the pipe portion 32, which is concentric with and surrounds the pipe portion 31, in a downward direction where it is again deflected and caused to flow upwardly along the pipe 33 and thereafter to the discharge flange 6. In the embodiment of FIG. 2 the partitioning walls 31, 32 and 33 may be at least partially formed of fissionable material such as U 235, so that the nuclear reaction which produces the heat will take place in this entire region. The reaction is further intensified by a surrounding reflector layer 9, consisting of zirconium hydride for example, which is in turn enclosed by a heat insulating layer 4'. Catalysts made of platinum for example, can be mounted in any suitable manner within the structure, and are shown for example in FIG. 2 in the form of ribs 34 extending from the pipe section 32 into the path of the stream. In contrast to the circulatory loop portion 2, according to FIG. 1, the loop portion 2' of FIG. 2 has the advantage, due to its more favorable geometrical design, of allowing for greater radiation power densities with lower radiation losses as well as greater density of absorbed radiation power. This is equally true both for neutron radiation as well as for gamma radiation.

The embodiment shown in FIG. 3 is a modification of that shown in FIG. 2 and, as aforementioned, includes a pipe 3' whose radius is enlarged at the location where the corrosion and fission products are to settle out or deposit. In FIG. 3 there is shown the aforementioned lining 35 which consists either of fissionable or of catalytic material.

It is apparent that the method of purifying a fuel solution in accordance with my invention is distinguished by the fact that the structural components necessary for performing the method are extremely simple. Consequently, the locations at which deposition takes place (within the pipeline system 3) can be heated practically without any possibility of trouble, particularly since no heating energy need be supplied from the outside.

It will be understood that each of the elements described above, or two or more together, may also find a useful application in other types of apparatus for purifying fuel solutions differing from the types described above.

While the invention has been illustrated and described as embodied in apparatus for purifying a fuel solution and also a method for purifying the same, it is not intended to be limited to the details shown, since various modifications in the method, as well as structural changes in the apparatus may be made without departing in any way from the essential features of my invention and within the scope and range of equivalents of the following claims.

I claim:

1. The method of clearing corrosion and fission products from a fuel solution of a homogeneous nuclear reactor, which comprises providing a conduit of heatable material as part of the circulatory system of the reactor, said heatable material including a fissionable material, and heating said conduit with energy originating within said system by stimulating said fissionable material to nuclear fission with delayed neutrons in the fuel solution to a temperature higher than the temperature of the fuel solution by circulating the fuel solution containing corrosion and fission products through said conduit whereby the corrosion and fission products are heated by and are deposited in said conduit.

2. The method of clearing corrosion and fission products from a fuel solution of a homogeneous nuclear reactor, which comprises providing a conduit of heatable material as part of the circulatory system of the reactor, said material including a coating of fissionable material on the inner surface of the conduit, and heating said conduit with energy originating within said system by stimulating said coating of fissionable material to nuclear fission with delayed neutrons in the fuel solution to a temperature higher than the temperature of the fuel solution by circulating the fuel solution containing corrosion and fission products through said conduit whereby the corrosion and fission products are heated by and are deposited in said conduit.

3. The method of clearing corrosion and fission products from a fuel solution of a homogeneous nuclear reactor, which comprises providing a conduit of heatable material as part of the circulatory system of the reactor, said conduit having a passivating coating comprising a corrosion-resistant substance on the inner surface thereof, and heating said conduit with energy originating within said system to a temperature higher than the temperature of the fuel solution by circulating the fuel solution containing corrosion and fission products through said conduit whereby the corrosion and fission products are heated by and are deposited in said conduit.

4. Apparatus for clearing corrosion and fission products from a fuel solution of a homogeneous nuclear reactor, comprising conduit means of heatable material forming part of the circulatory system of the reactor, said heatable material including a fissionable material, and heat-insulating means surrounding said conduit means and insulating said conduit means against substantially all heat losses, said conduit means being heatable by excitation of said fissionable material to nuclear fission with delayed neutrons in the fuel solution to an inner surface temperature higher than the temperature of the fuel solution when the fuel solution containing corrosion and fission products circulates through said conduit means, whereby the corrosion and fission products are heated by and are deposited in said conduit means.

5. Apparatus for clearing corrosion and fission products from a fuel solution of a homogeneous nuclear reactor, comprising conduit means of heatable material forming part of the circulatory system of the reactor, said conduit means having an inner surface coated with a layer of fissionable material, and heat-insulating means surrounding said conduit means and insulating said conduit means against substantially all heat losses, said conduit means being heatable by excitation of said layer of fissionable material to nuclear fission with delayed neutrons in the fuel solution to an inner surface temperature higher than the temperature of the fuel solution when the fuel solution containing corrosion and fission products circulates through said conduit means, whereby the corrosion and fission products are heated by and are deposited in said conduit means.

6. Apparatus for clearing corrosion and fission products from a fuel solution of a homogeneous nuclear reactor, comprising conduit means of heatable material forming part of the circulatory system of the reactor, said conduit means having an inner surface and a passivating coating comprising a corrosion-resistant substance on said inner surface, and heat-insulating means surrounding said conduit means and insulating said conduit means against substantially all heat losses, said conduit means being heatable with energy originating within the reactor to an inner surface temperature higher than the temperature of the fuel solution when the fuel solution containing corrosion and fission products circulates through said conduit means, whereby the corrosion and fission products are heated by and are deposited in said conduit means.

7. Apparatus for clearing corrosion and fission products from a fuel solution of a homogeneous nuclear reactor, comprising a conduit of heatable and partly fissionable material replaceably connected in and forming part of the circulatory system of the reactor, said system including pump means for pumping fuel solution therethrough, said conduit of heatable material comprising a flow-through chamber formed of a plurality of spaced coaxial pipes and baffle means for guiding the fuel solution in the circulatory system in a serpentine path, whereby a relatively large surface area of said conduit of heatable material is exposed to said fuel solution containing corrosion and fission products, radiation reflector means surrounding said conduit of heatable and partly fissionable material, and heat-insulating means surrounding said reflector means and said conduit of heatable material for insulating the latter against substantially all heat losses, said conduit of heatable and partly fissionable material being heatable with energy originating within the reactor by excitation of said fissionable material to nuclear fission with delayed neutrons in the fuel solution to an inner surface temperature higher than the temperature of the fuel solution when the fuel solution containing corrosion and fission products circulates through said conduit, whereby the corrosion and fission products are heated by and are deposited in said conduit of heatable material.

8. Apparatus for clearing corrosion and fission products from a fuel solution of a homogeneous nuclear reactor, comprising conduit means of heatable material forming part of the circulatory system of the reactor, said conduit means comprising a plurality of pipes having end flanges secured to one another, at least one of said pipes including an inner layer of a fissionable substance, at least another of said pipes including an inner layer of catalyst material, and at least a third one of said pipes having a wall thickness substantially greater than the others; and heat-insulating means surrounding said conduit means and insulating said conduit means against substantially all heat losses, said one of said pipes being heatable by excitation of said fissionable substance to nuclear fission with delayed neutrons in the fuel solution, said other of said pipes being heatable by recombination of radiolytic disassociation products of water in the fuel solution in the presence of said catalyst material, and said third one of said pipes being heatable by generation of heat absorption in its thick walls, to an inner surface temperature higher than the temperature of the fuel solution when the fuel solution containing corrosion and fission products circulates through said conduit means, whereby the corrosion and fission products are heated by and are deposited in said conduit means.

References Cited by the Examiner

UNITED STATES PATENTS

| | | | |
|---|---|---|---|
| 2,874,106 | 2/1959 | Hammond et al. | 176—39 |
| 3,015,617 | 1/1962 | Brunings | 176—46 |
| 3,050,454 | 8/1962 | Barr et al. | 176—39 |
| 3,074,868 | 1/1963 | Turkevich | 176—37 |

L. DEWAYNE RUTLEDGE, *Primary Examiner.*

REUBEN EPSTEIN, CARL D. QUARFORTH,
*Examiners.*

J. V. MAY, H. BEHREND, *Assistant Examiners.*